United States Patent
Kohlhofer et al.

[11] Patent Number: 5,284,590
[45] Date of Patent: Feb. 8, 1994

[54] METHOD FOR CONTROLLING FOULING IN COOLING TOWER FILL

[75] Inventors: John F. Kohlhofer, Homestead, Fla.; Patrick H. Gill, Zelienople, Pa.

[73] Assignee: Calgon Corporation, Pittsburgh, Pa.

[21] Appl. No.: 717,758

[22] Filed: Jun. 19, 1991

[51] Int. Cl.$^5$ ............................................. C02F 5/12
[52] U.S. Cl. ................................. 210/701; 210/764; 261/DIG. 11
[58] Field of Search .................. 210/698–701, 210/764; 252/180; 261/DIG. 11

[56] References Cited

U.S. PATENT DOCUMENTS

| | | | |
|---|---|---|---|
| 3,578,589 | 5/1971 | Hwa et al. | 210/701 |
| 3,709,816 | 1/1973 | Walker et al. | 210/701 |
| 3,928,196 | 12/1975 | Persinski et al. | 252/180 |
| 4,385,011 | 5/1983 | Skold | 261/DIG. 11 |
| 4,451,376 | 5/1984 | Sharp | 210/701 |
| 4,510,059 | 4/1985 | Amjad et al. | 210/701 |
| 4,618,448 | 10/1986 | Cha et al. | 252/180 |
| 4,640,793 | 2/1987 | Persinski et al. | 210/701 |
| 4,717,542 | 1/1988 | Mitchell | 210/699 |
| 4,936,987 | 6/1990 | Persinski et al. | 210/699 |
| 4,997,571 | 3/1991 | Roensch et al. | 210/747 |
| 5,034,155 | 7/1991 | Soeder et al. | 210/701 |

FOREIGN PATENT DOCUMENTS 84301450 3/1984 European Pat. Off. .
57-084794 5/1982 Japan .

OTHER PUBLICATIONS

Calgon bulletin 11–464.
Calgon bulletin 11–236b.

Primary Examiner—Peter Hruskoci
Attorney, Agent, or Firm—W. C. Mitchell; C. M. Caruso

[57] ABSTRACT

Method for controlling fouling in high efficiency cooling tower fill using low molecular weight 2-acrylamido-2-methylpropyl sulfonic acid/acrylic acid-type polymers.

3 Claims, 2 Drawing Sheets

METHOD FOR CONTROLLING FOULING IN COOLING TOWER FILL

BACKGROUND OF THE INVENTION

This invention relates to a method for controlling fouling in high efficiency cooling tower fill, particularly in evaporative film media such as Munters fill, comprising adding to cooling water prone to cause fouling which contacts said fill an effective amount of a low molecular weight, water-soluble 2-acrylamido-2-methylpropyl sulfonic acid/acrylic acid-type polymer.

Such polymers are commercially available from Calgon Corporation, Pittsburgh, Pa., as TRC-233 ® and TRC-271 ®.

The use of such polymers is well known in the water treatment art. For example:

U.S. Pat. No. 3,928,196 discloses the use of copolymers of 2-acrylamido-2-methylpropyl sulfonic acid and acrylic acid as scale inhibitors.

U.S. Pat. No. 4,640,793 discloses the use of admixtures containing carboxylic acid/sulfonic acid polymers and phosphonates as scale and corrosion inhibitors.

U.S. Pat. No. 4,618,448 discloses the use of polymers comprising an unsaturated carboxylic acid, an unsaturated sulfonic acid and an unsaturated polyalkylene oxide as scale inhibitors.

Japanese No. 57-084794 discloses the use of copolymers of acrylic acid and allyl polyethylene glycol as scale inhibitors.

European patent application 84301450.7 discloses carboxylic acid/sulfonic acid copolymers in combination with organic phosphonates as scale inhibitors.

U.S. Pat. No. 4,510,059 discloses the use of carboxylic functional polyampholytes to reduce silica deposits in aqueous systems.

U.S. Pat. No. 4,936,987 discloses acrylic acid/2-acrylamido-2-methyl propyl sulfonic acid-type polymer compositions and the use thereof as scale and corrosion inhibitors in water treatment.

U.S. Pat. No. 3,709,816 discloses the use of 2-acrylamido methylpropyl sulfonic acid polymers to fluidize and disperse alluvial deposits in aqueous systems, including cooling towers. This reference does not, however, disclose the efficacy of the instant low molecular weight polymers to control fouling, including biofouling, in high performance evaporative film fills.

U.S. Pat. No. 3,709,815 discloses the use of 2-acrylamido-2-methylpropyl sulfonic acid polymers as boiler water dispersives and conditioners.

While various uses of the instant polymers are widely known in the art, the instant inventors do not believe that the use of low molecular weight, water soluble acrylic acid/acrylamido-2-methylpropyl sulfonic acid-type polymers to control fouling, including biofouling, in high performance cooling tower fill is known or suggested in the art.

In high efficiency hyperbolic natural draft towers, fouling is particularly troublesome. As used herein, the term "fouling" refers to the buildup on or in cooling tower fill media of one or more biofouling agents, alone or in combination with insoluble materials selected from the group consisting of alluvial solids, clays, muds, silts, insoluble metallic scales and metallic salts or oxides. Biological growth, including but not limited to that caused by algae and bacteria, comprises biofouling solids. Such fouling/biofouling adversely impacts the performance of the fill used in cooling towers by plugging the fill, impeding flow through the fill and/or disrupting film formation, thereby diminishing heat transfer.

Evaporative film-forming fills are commonly used in today's cooling towers. These fills comprise flat or formed sheets which are generally made of a plastic material such as polypropylene or PVC. Water films form on these plastic sheets, which facilitates heat transfer between the water film and air passing through the cooling tower. As used herein, "high efficiency cooling tower fill" refers to evaporative film media used in high efficiency cooling towers. This type of fill (for example, Munter's fill) is especially susceptible to fouling in general and biofouling in particular.

DESCRIPTION OF THE INVENTION

Figure 1:
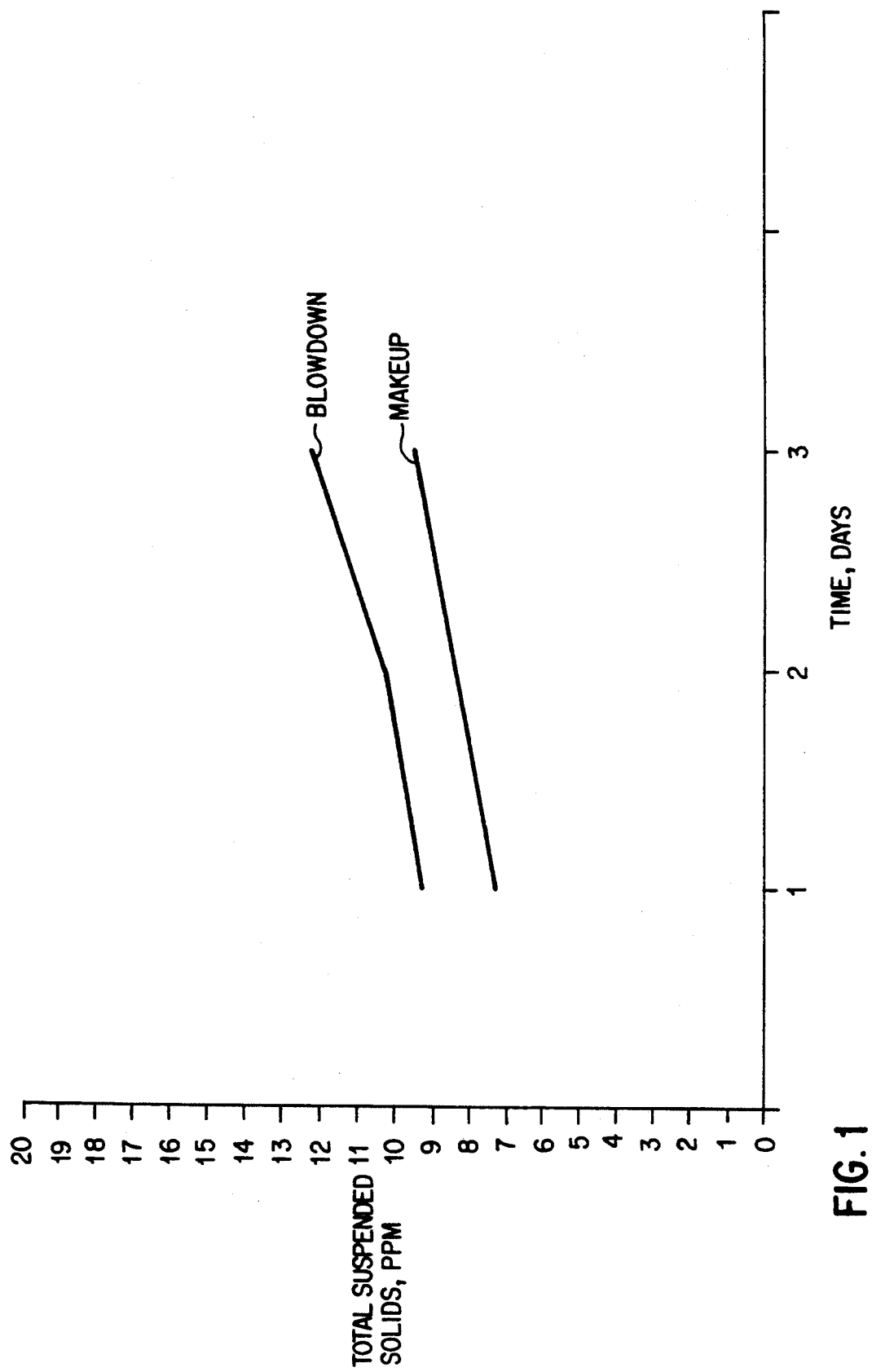
FIGS. 1 and 2 demonstrate the effect of an acrylic acid/2-acrylamido-2-methylpropyl sulfonic acid polymer on cooling tower suspended solids. Application of the polymer raised the level of suspended solids in the blowdown above makeup suspended solids levels, which indicates that clean-up of cooling tower fill occurred.

The instant invention is directed to a method for controlling fouling, including biofouling, in high efficiency cooling tower fill comprising adding to water having a tendency to foul said high efficiency cooling tower fill an effective amount for the purpose of a water-soluble polymer comprising:
a) acrylic acid or methacrylic acid; and
b) 2-acrylamido-2-methylpropyl sulfonic acid or 2-methyacrylamido-2-methylpropyl sulfonic acid; wherein the weight ratio of a):b), on an active basis, ranges from about 4:1 to about 1:1; and wherein the molecular weight of the polymer ranges from about 1,000 to about 12,000.

While the instant polymers may also contain additional mer units, the preferred polymers are copolymers of acrylic acid and 2-acrylamido-2-methylpropyl sulfonic acid, hereinafter referred to as AA/SA polymers. The most preferred polymers are 60/40 w/w copolymers of acrylic acid and 2-acrylamido-2-methylpropyl sulfonic acid having a molecular weight of about 7500-9500. Such polymers are commercially available from Calgon Corporation, Pittsburgh, Pa., as TRC-233 ®. Another preferred polymer is a terpolymer comprising acrylic acid, 2-acrylamido-2-methylpropyl sulfonic acid and a polyalkylene oxide which is commercially available from Calgon as TRC-271 ®.

While the instant polymers are believed to be effective on all types of high performance, evaporative film media, they are believed to be especially effective on plastic high efficiency fill material such as "Munters" fill, which is commercially available from the Munters Corporation. Thus, the instant inventors have discovered that these polymers substantially reduce fouling, including biofouling, in cooling towers, including hyperbolic cooling towers containing Munters fill where conventional water treatment scale inhibitors such as acrylic acid/hydroxy propylacrylate (AA/HPA) copolymers are believed to be largely ineffective.

The instant polymers can be added to cooling water which tends to cause fouling and biofouling problems in or on high performance fill material by any convenient means. Addition of the instant polymers to cooling tower water is believed by the inventors to be well within the skill of those familiar with cooling tower operations.

An effective amount of the instant polymer should be added to cooling water prone to cause fouling and biofouling in or on high performance fill. Preferably, the dosage of the instant polymers, on an active basis, should range from about 0.1 to about 500 ppm, based on the weight of water in the system being treated. More preferably, the dosage should range from about 0.1 to about 50 ppm. While there is no known upper dosage limitation, based on the performance, the upper limit is generally dictated by economic considerations or discharge permits.

The instant polymers can be used in conjunction with other cooling tower additives, including but not limited to corrosion inhibitors, biocides, etc.

In summary, it has been discovered that low molecular weight, water soluble polymers of 2-acrylamido-2-methylpropyl sulfonic acid and acrylic acid are effective in controlling the fouling, including biofouling, of high performance fill materials found in cooling towers. These polymers are especially effective in treating natural draft hyperbolic cooling towers which contain Munters fill.

As such, the invention constitutes an improvement over the disclosure of U.S. Pat. No. 3,709,816, which is silent regarding the ability of low molecular weight, water soluble, acrylic acid/2-acrylamido-2-methylpropyl sulfonic acid acid-type polymers to control fouling, particularly biofouling, on high performance fill such as Munter's fill.

EXAMPLES

The following example further demonstrates the instant invention. The example is not, however, intended to limit the invention in any way.

EXAMPLE 1

A natural draft hyperbolic cooling tower containing high performance evaporative film fill (Munter's fill) experienced severe fouling. The fouling deposits contained large amounts of insoluble scale and silt and moderate amounts of aerobic bacteria and algae.

0.28 active ppm, based on total cooling water weight, of a copolymer of acrylic acid 2-acrylamido-2-methylpropyl sulfonic acid (TRC-233 ®, commercially available from Calgon Corporation, Pittsburgh, Pa.) was added to the tower makeup. The polymer effectively controlled fouling in the Munter's fill.

Further, a gradual cleanup of the fouled cooling tower fill occurred as is shown in FIG. 1. This is evidenced by the fact that the suspended solids level in the blowdown was higher than in the makeup.

Figure 2:
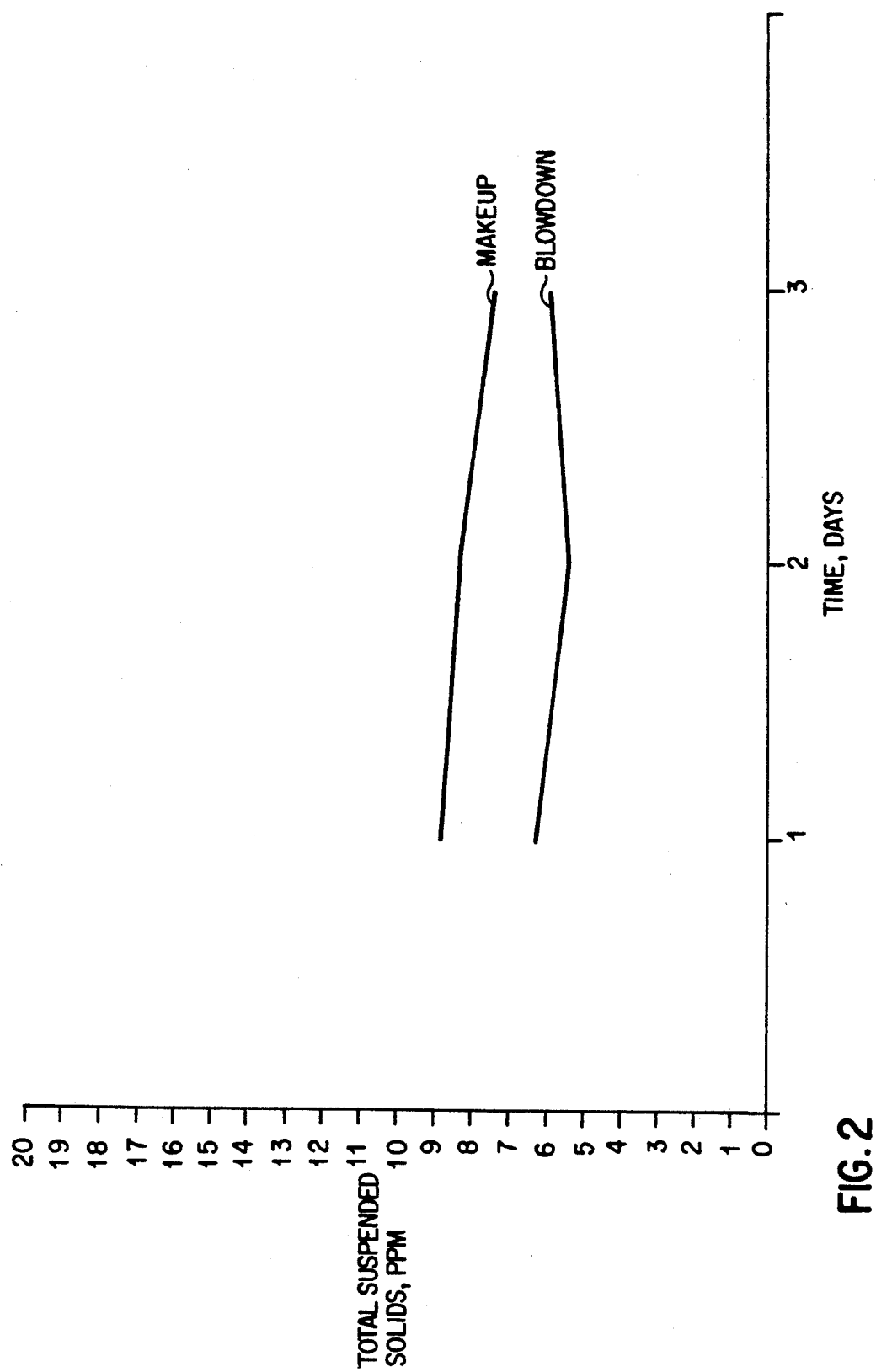

FIG. 2 shows a similar cooling tower which was not treated with the AA/SA copolymer. In this figure, the suspended solids level is lower in the blowdown than in the makeup. This indicates that fouling occurred in the absence of the AA/SA polymer.

Treatment with the AA/SA polymer allowed the utility to run the system without deaerating due to excessive effluent temperatures.

What we claim is:

1. A method for controlling fouling, including biofouling, in natural draft hyperbolic cooling towers containing plastic cooling tower fill comprising adding the cooling water having a tendency to foul said plastic cooling tower fill an effective amount for the purpose of a watersoluble polymer comprising:
   a) acrylic acid or methacrylic acid; and
   b) 2-acrylamido-2-methylpropyl sulfonic acid or 2-methacrylamido-2-methylpropyl sulfonic acid; wherein the weight ratio of a):b), on an active basis, ranges from about 4:1 to about 1:1; and wherein the molecular weight of said polymer ranges from about 1,000 to about 12,000.

2. The method of claim 1, wherein said weight ratio is about 1.5:1.

3. The method of claim 2, wherein said effective amount is at least about 0.1 ppm, based on the weight of said cooling water.

* * * * *